United States Patent [19]

Wallace

[11] 4,248,896

[45] Feb. 3, 1981

[54] PROCESS FOR BAKING BREAD

[76] Inventor: Leland C. Wallace, 3509 Casitas Ave., Los Angeles, Calif. 90039

[21] Appl. No.: 16,506

[22] Filed: Mar. 1, 1979

[51] Int. Cl.³ ............................................. A21D 6/00
[52] U.S. Cl. ................................... 426/19; 426/478; 426/549
[58] Field of Search .......................... 426/19, 549, 478

[56] References Cited
FOREIGN PATENT DOCUMENTS 563503 9/1958 Canada ................................... 426/549

OTHER PUBLICATIONS

Pyler, *Baking Science & Technology,* vol. 1, Siebel Pub. Co., Chicago, Ill. 1973, pp. 412–416.

*Primary Examiner*—Raymond N. Jones
*Assistant Examiner*—Elizabeth A. Hatcher
*Attorney, Agent, or Firm*—Warren, Chickering & Grunewald

[57] ABSTRACT

A process for baking bread by separating a portion of the flour to be used into a wet gluten phase and a starch slurry phase, converting the starch slurry phase into sugar, combining the wet gluten phase and the sugar into a dough including the remaining flour or other weaker flours and treating and baking the resulting dough to produce a bread product.

4 Claims, 4 Drawing Figures

PROCESS FOR BAKING BREAD

BACKGROUND OF THE INVENTION

The major protein component of wheat flour and triticale flour is gluten. Gluten is essential for making rising bread because it provides the material for forming the gas cells which give the bread its texture. Different wheat flours have different amounts of gluten in them. Wheat flours having high percentages of gluten are called strong or stronger flours, while wheat flours having small percentages of gluten are called weak or weaker flours. The description that follows and the appended claims relate equally to wheat and triticale as the two gluten-containing grains of the process of this invention.

Advances in agriculture over the years have greatly increased the yield of wheat that can be obtained from a unit of land. However, as the yield of grain increases, it has been found in general that the quantity of gluten in the wheat decreases. Prior to modern agricultural methods it was common for wheat to contain 12% or more gluten, but modern wheat from high-yield agriculture contains about 10% or less of gluten. The term "gluten" as used herein relates to the gluten fraction of wheat which includes moisture; however, the amounts stated are adequate bases for comparison because they are measured on an equivalent basis.

As a result of the foregoing, much wheat is so deficient in gluten that it is difficult to employ it as the sole grain-constituent in bread doughs.

Gluten can be separated from flour readily. When flour is soaked in water, two phases can be readily separated. One phase is a watery suspension of starch in water, and the other is a wet elastic mass. The wet, elastic mass is the gluten phase, and it contains gluten, starch, and water.

Most modern commercial bakeries require about 12% gluten in the flour to obtain satisfactory bread. This gluten concentration can be obtained by adding commercially obtainable dried gluten to the amount that is indigenous to the flour. Dried gluten is obtained from commercial sources which separate gluten from wheat flour and dry it to prevent spoilage. In such operations, starch slurry is an industrial by-product that must be utilized. The dried gluten can be reconstituted by blending it with water, but the reconstituted gluten is only about 70% as effective as the original wet gluten separated from the flour.

The rising or leavening of bread is a complex phenomenon. Leavening includes at least the action of yeast enzymes to decompose carbohydrate to form, among other things, carbon dioxide gas. The dispersion of the resultant carbon dioxide gas through the dough forms bubbles which in turn form a gluten network which traps the bubbles. Baking the bread stabilizes the dough structure. Since sugar is a simpler carbohydrate than starch, the decomposition process promoted by yeast can proceed much faster if sugar is introduced into the flour. In commercial baking, this is frequently done because it is desirable, almost necessary, to bake bread commercially in a continuous process where the mixing, panning, rising, and baking of dough is carried out in a continuous process. In such a continuous process it is essential to employ sugar to avoid long delays in the rising of the dough. Adding sugar to a bread dough speeds the rising process but it even further diminishes the ratio of gluten to carbohydrate unless even greater quantities of dried gluten are added.

SUMMARY OF THE INVENTION

This invention is a method for making bread from weaker flour. The process of this invention overcomes or greatly mitigates the problems enumerated above. The process of this invention employs a weaker flour which is divided into a first portion and a second portion either before or after it is made into a dough by mixing it with water. The second portion of the flour is the larger portion.

The first portion of flour is mixed with enough water to effect separation of gluten from starch slurry and it is allowed to hydrate for a period sufficient to produce a mass of wet gluten. The starch that results is separated from the wet gluten and subjected to a conversion process, preferably with enzymes to convert the starch to simpler carbohydrates and sugar hereinafter referred to as sugar syrup. The starch slurry is maintained at the proper conditions and for the proper period of time to effect the conversion which results in a syrup consisting largely of glucose.

The second portion of flour is made into dough to which the wet gluten and the syrup recovered from the first portion of flour are added. Other ingredients essential for making of bread are added to the dough, such as yeast, salt, additional water, and other appropriate ingredients known to the art. The resultant dough is mixed and allowed to rise and is then baked to a bread product. Preferably the entire process of blending ingredients, mixing, forming into loaves, rising and baking is a continuous process.

The process of this invention is self-contained as far as flour-based materials are concerned. The process generates enough gluten and sugar syrup to provide a fast rising, high-gluten bread dough without outside sources or gluten or sugar. The process is more economical in that no energy is needed to dry gluten and the elastic strength of the gluten is not diminished because it is used moist, fresh, and at 100% effectiveness. Immediate use of the gluten avoids spoilage and the need for drying. The gluten can be refrigerated or frozen for longer periods if necessary. The process also employs the starch slurry economically, both from the standpoint or material utilization and from the standpoint of avoiding any waste water disposal problems. All process water becomes dough ingredient water.

DETAILED DESCRIPTION OF THE INVENTION

The process of the present invention may be better understood with relation to the accompanying drawings.

Figure 1:
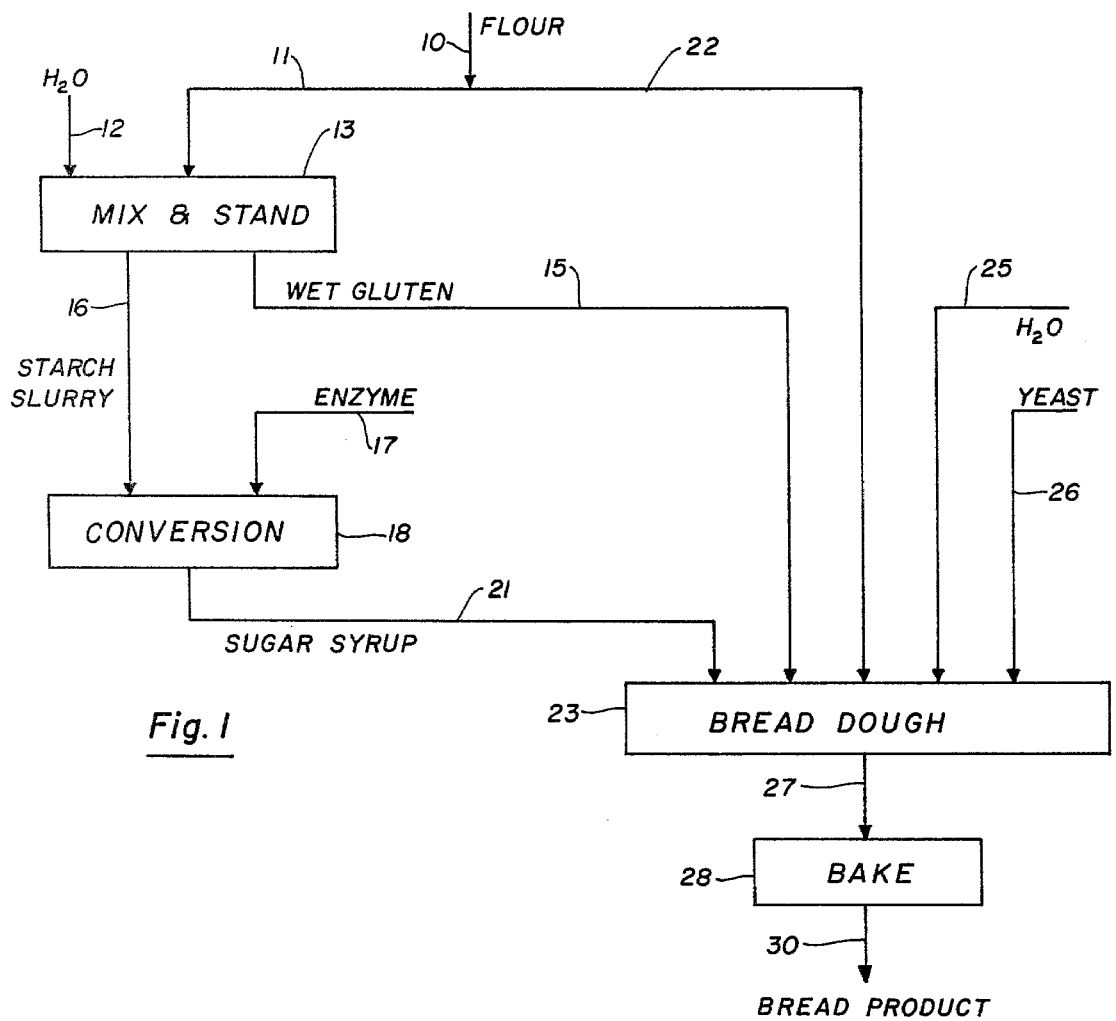
FIG. 1 is a schematic flow diagram illustrating a process embodying this invention.

In FIG. 1, a source of flour 10 is divided to include a portion 11 and a portion 22. The portion 11 is introduced into a vessel 13 to which water 12 is added. The flour and water mixture is agitated in excess water until a wet gluten phase is separated from a starch in water slurry phase. The wet gluten phase is removed via 15 and the starch slurry phase is removed via 16. The starch slurry phase is introduced into a conversion vessel 18 along with enzymes added through line 17. In the conversion vessel 18, conditions are maintained to convert the starch to sugar syrup, which is removed through line 21.

The portion of flour 22 is introduced into a bread dough mixer 23 along with the wet gluten 15 and the sugur syrup 21. Additional water is added through line 25 and yeast 26 is introduced. The ingredients are blended into a bread dough under conditions to become thoroughly mixed and to cause the sugary syrup to be metabolized by the yeast to produce carbon dioxide, and other fermentation products, and effect the rising of the bread dough. The yeast and the various products of its metabolism also favorably influence the flavor of the bread and its crust color. The bread dough is passed via 27 where it is divided into loaves and baked in oven 28 to produce a bread product recovered at 30.

Figure 2:
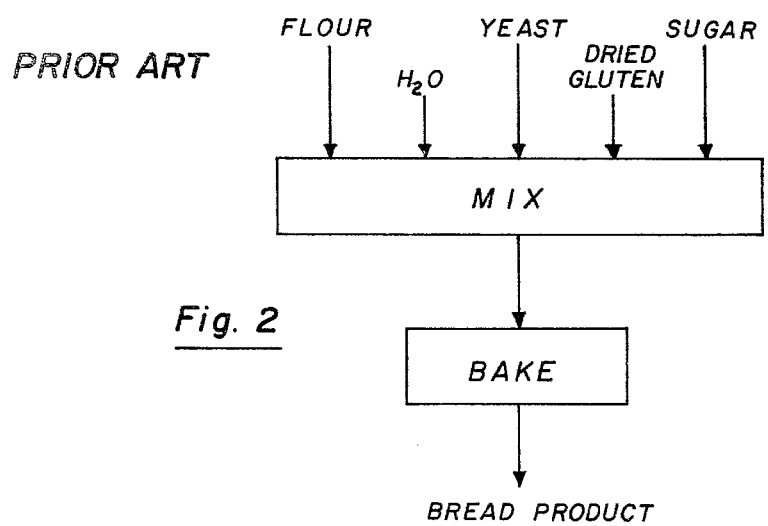
FIG. 2 is a schematic flow diagram illustrating a process typical of the prior art.

FIG. 2 is illustrative of the prior art. In FIG. 2, it is seen that flour, water, yeast, dried gluten and sugar are obtained from independent sources all mixed together with other essential ingredients for producing bread, divided into loaves, allowed to rise, and baked. In the prior art process, dried gluten must be used in quantities in excess of the fresh gluten used in the process of FIG. 1 because its effectiveness has been diminished by being dried. In the process of FIG. 2, sugar is obtained from an independent source. Although not shown in the process of FIG. 2, a disposal problem is encountered in producing dried gluten because the solubles (sugars, amino acids, etc.) left over after starch recovery cannot be utilized readily, and; moreover, energy is required to dry the gluten, starch, and soluble phases which is essential to avoid spoilage and avoid sewage disposal problems.

Figure 3:
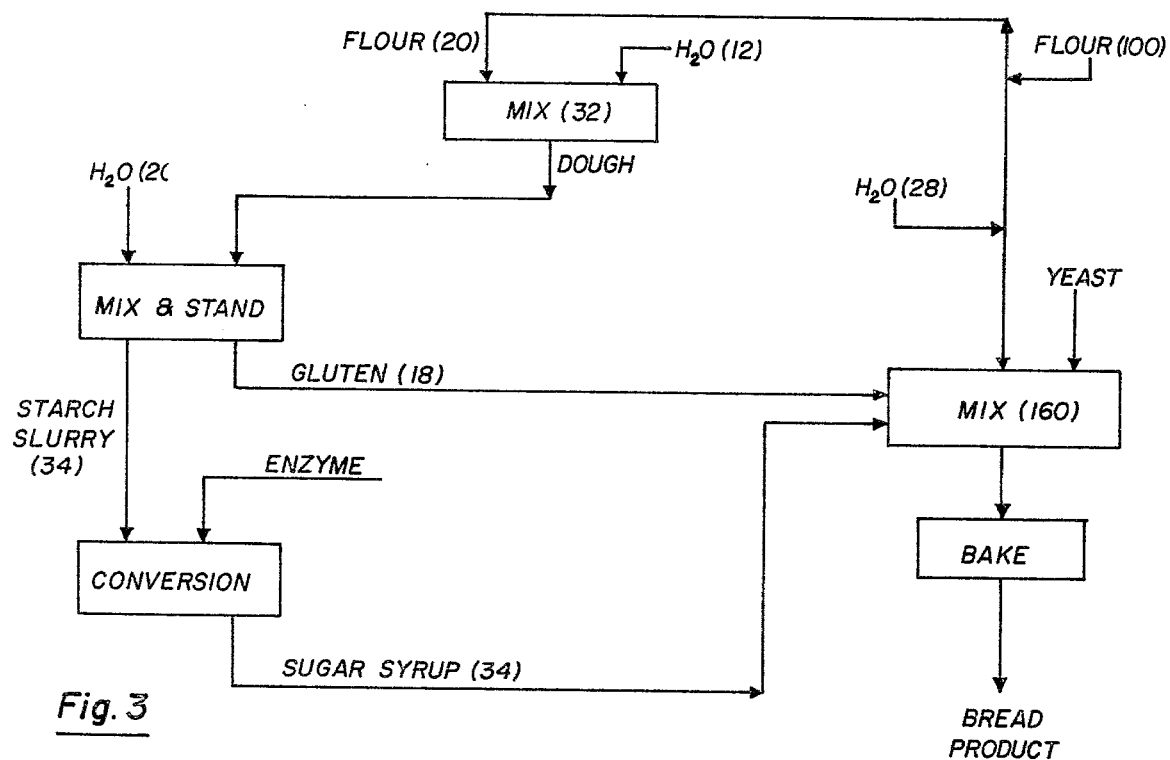
FIG. 3 is a schematic flow diagram illustrating a particular process embodying this invention.

FIG. 3 illustrates a particular process of this invention. In the process illustrated in FIG. 3, from 100 lbs. of flour, a 20 lb. quantity is mixed with 12 lbs. of water to form 32 lbs. of dough. The 32 lb. batch of dough is mixed with 20 additional pounds of water and, on mixing and separating, results in the production of 18 lbs. of wet gluten and 34 lbs. of starch slurry. The starch slurry and an enzyme system are introduced into a conversion chamber to produce a syrup containing approximately seven pounds of sugar which is largely glucose.

An 80 lb. quantity of flour from the original 100 lbs. is mixed with 28 lbs. of water and added to a mixer along with the wet gluten and the sugar syrup. This produces a 160 lb. batch of dough, not counting yeast and other ingredients that are added. This dough is a higher gluten dough on a dry weight basis than a corresponding dough to which sugar is added from an outside source at the same level, and it readily can be baked to form a high-quality bread product.

Figure 4:
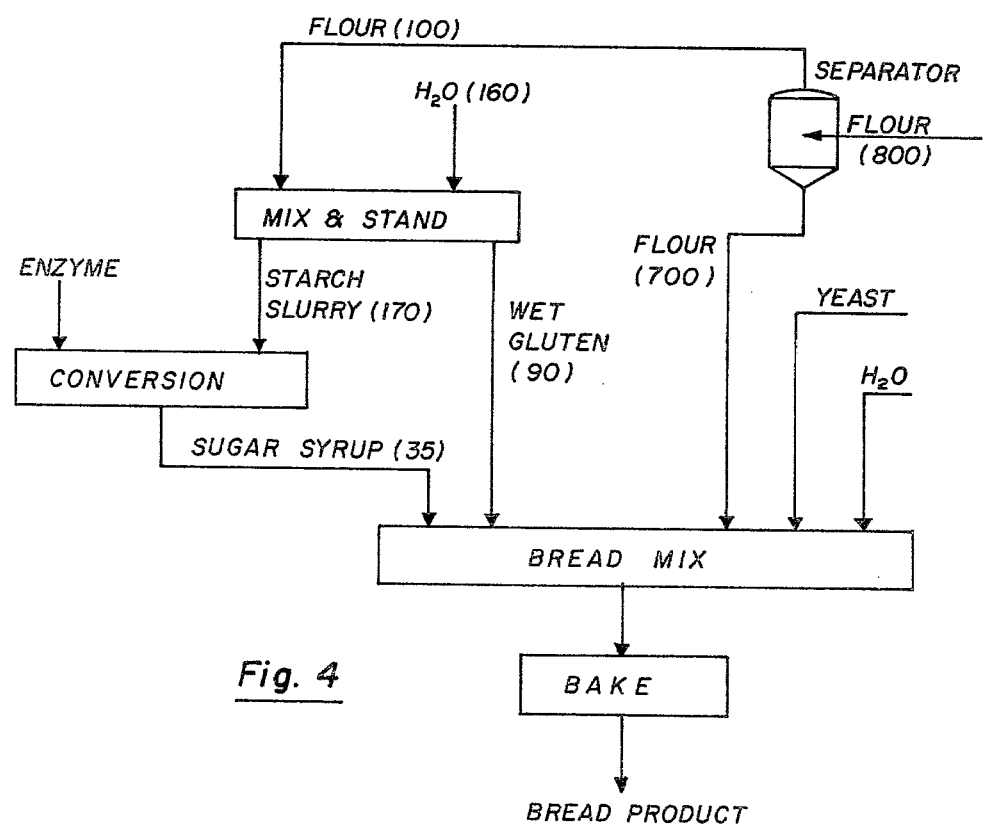
FIG. 4 is a schematic flow diagram illustrating another process embodying this invention.

FIG. 4 illustrates another process embodying this invention. In the process of FIG. 4, 800 lbs. of flour are air-classified in a turbo separator into a 100 lb. batch of higher-protein flour and a 700 lb. batch of lower-protein flour. The 100 lb. batch of higher-protein flour is mixed with 160 lbs. of water and allowed to stand until 90 lbs. of wet gluten phase separates from 170 lbs. of starch slurry phase. The starch slurry phase is mixed with an enzyme system, and, in a conversion chamber, conditions are maintained to convert it to about 35 lbs. of sugar syrup. 700 lbs. of low-gluten flour is then mixed with the 90 lbs. of wet gluten and the 35 lbs. of sugar syrup along with yeast, water, and other appropriate ingredients for a bread dough, and the bread dough is divided into loaves, allowed to rise, and baked to form a bread product.

Conversion of starch slurry to a syrup of simple carbohydrates and sugar is known to the art. One method for converting starch slurry to sugar syrup is to first heat the slurry to gelatininze it and then treat it with alpha-amylase and amyloglucosidase, either in sequence or in combination. The enzyme may be mixed with the starch slurry or it may be supported on an inert material such as porous silica or alumina. When supported enzyme is employed, it exerts the same influence as enzyme mixed with the slurry but it is not lost in the process nor does it become part of the bread that is ultimately baked.

Gluten produced in the process of this invention may be used in its as-produced form or it may be treated to improve its utility in bread. One such treatment is to add 2%-3% bakers' yeast to the gluten and to permit it to ferment for several hours before adding it to the bread dough. Fermentation with bakers' yeast does not diminish the effectiveness of the gluten and it improves the flavor of the bread that is eventually made from it. Crust color, bread volume, and reduction of mixing times are also benefits obtained from the use of bakers' yeast. Barley malt or other malted cereals may also be added to the dough to improve the flavor, color or texture of the final bread product.

What is claimed is:

1. A process for producing bread from weaker flour comprising:
   a. dividing said flour into a first and second portion;
   b. mixing said first portion of flour with sufficient water and allowing the mixture to hydrate for a period of time sufficient to produce a mass of wet gluten phase and starch slurry phase;
   c. separating said wet gluten phase and starch slurry phase;
   d. converting said starch slurry phase to sugar syrup;
   e. forming a dough utilizing said second portion of flour, said wet gluten phase, said sugar syrup, and other essential bread making ingredients;
   f. allowing dough to rise; and
   g. baking said dough to form a bread product.

2. The process of claim 1 wherein said weaker flour is classified to form a first portion having higher gluten content and a second portion having lower gluten content.

3. The process of claim 1 wherein all stages of the process are performed continuously.

4. The process of claim 1 including the steps of fermenting said wet gluten phase with bakers' yeast.

* * * * *

UNITED STATES PATENT AND TRADEMARK OFFICE
CERTIFICATE OF CORRECTION

PATENT NO. : 4,248,896
DATED : February 3, 1981
INVENTOR(S) : Leland C. Wallace

It is certified that error appears in the above-identified patent and that said Letters Patent are hereby corrected as shown below:

In column 2, line 16, after "starch" insert --slurry--.

In column 2, line 46, after "standpoint" delete "or" and insert --of--.

In column 3, line 12, delete "sugary" and insert --sugar--.

Signed and Sealed this

Twenty-first Day of April 1981

[SEAL]

Attest:

RENE D. TEGTMEYER

Attesting Officer    Acting Commissioner of Patents and Trademarks